United States Patent [19]
Cadet

[11] 3,753,477
[45] Aug. 21, 1973

[54] GRADUAL-LOCKING FREEWHEELS

[75] Inventor: Raymond Cadet, Annecy (Haute Sanoie), France

[73] Assignee: Societe Nouvelle De Roulements Annecy, Haute Savoie, France

[22] Filed: Oct. 1, 1971

[21] Appl. No.: 185,770

[30] Foreign Application Priority Data
Oct. 16, 1970 France .................................. 7037434

[52] U.S. Cl. ............ 192/41 A, 192/52, 192/105 CD
[51] Int. Cl. ......................... F16d 41/07, F16d 43/24
[58] Field of Search .................... 192/41 A, 45.1, 52, 192/105 CD, 105 CE; 188/82.8

[56] References Cited
UNITED STATES PATENTS

| | | | |
|---|---|---|---|
| 2,956,655 | 10/1960 | Ferris et al. | 192/45.1 |
| 2,750,019 | 6/1956 | Ferris | 192/45.1 |
| 2,753,027 | 7/1956 | Troendly et al. | 192/45.1 |
| 3,545,581 | 12/1970 | Kent | 192/45.1 |
| 3,651,908 | 3/1972 | Oldfield | 192/41 A X |

*Primary Examiner*—Allan D. Herrmann
*Attorney*—Stevens, Davis, Miller & Mosher

[57] ABSTRACT

This freewheel device of the wedging-cam locking type comprises a series of cam members retained by a positioning cage between inner and outer rings. The cam members are held in relative position and in bearing engagement with the cage by individual resilient means counteracting the action of the centrifugal force. Said cage is connected to one ring and the cam members engage the rings by pivoting or rocking under the centrifugal force only beyond a predetermined speed given for a limited number of cam members of which the return force of the individual resilient means is the lowest and balanced by the centrifugal force. This device is applicable to the freewheel coupling between engine and change-speed mechanisms of automotive vehicles.

6 Claims, 13 Drawing Figures

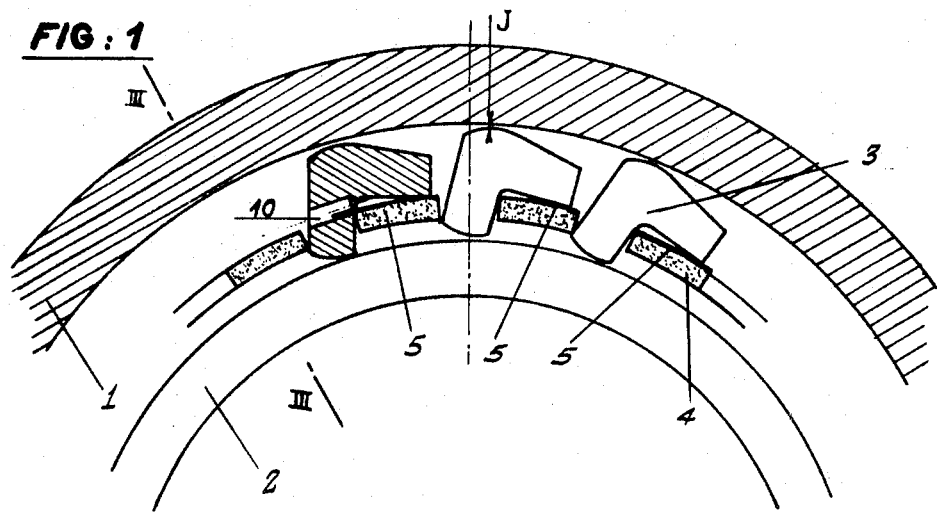
FIG. 1
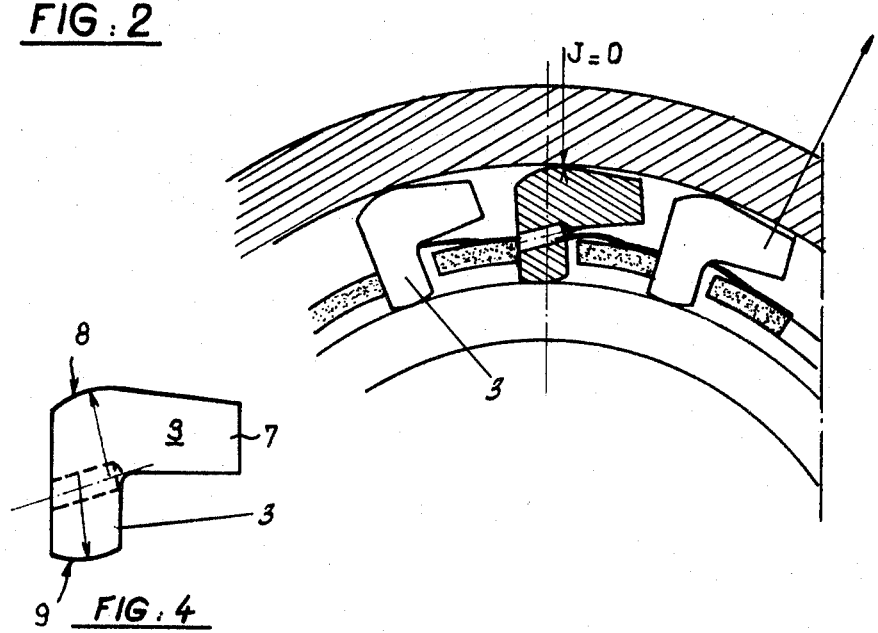
FIG. 2
FIG. 4

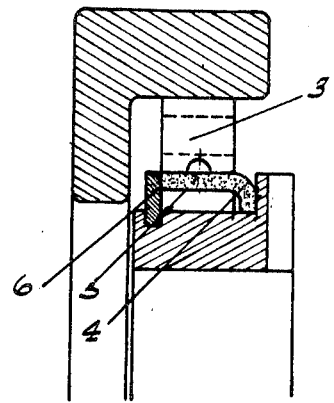
FIG. 3
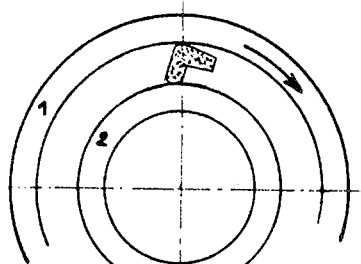
FIG. 10
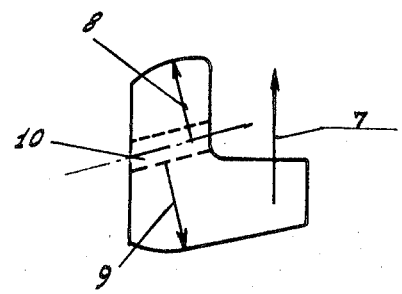
FIG. 8
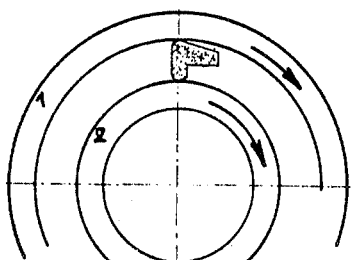
FIG. 11
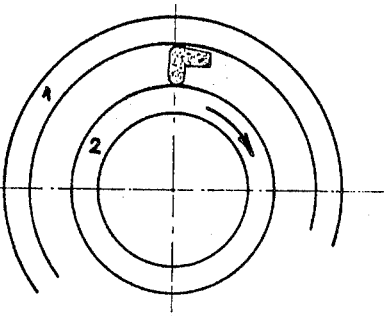
FIG. 12
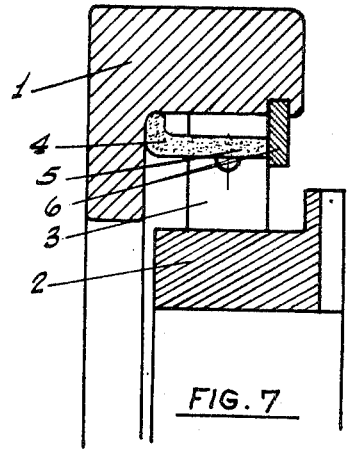
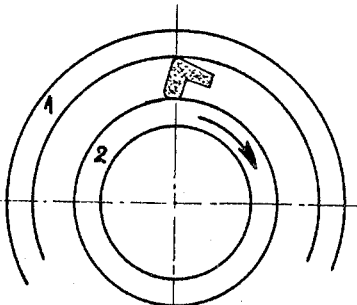
FIG. 13
FIG. 7

GRADUAL-LOCKING FREEWHEELS

The present invention relates in general to freewheel mechanisms and has specific reference to a freewheel device of the type having a zero residual torque or drag at low speed and characterized by a gradual locking engagement.

A freewheel mechanism is already known which comprises an outer ring and an inner ring between which cam members are adapted to slide or become wedged according to the direction of relative rotation of these rings, irrespective of the absolute speeds of each ring. To obtain a reliable operation and the quickest possible wedging effect when reversing the drive, said cam members must necessarily be kept in frictional contact with the inner and outer rings by suitable spring means adapted on the other hand to maintain the contact with all the cam members so that the highest possible weding torque be available.

However, these conventional arrangements are objectionable for various reasons :

Firstly, the driving ring carries along the driven ring through the frictional contact of said cam members if said driven ring is free or operatively connected to a mechanism not subjected to any braking force. This is the 'drag torque' of the freewheel ;

Secondly, the useful life of the freewheel is reduced due to the frictional contact ;

Thirdly, it is particularly difficult to properly lubricate the freewheel and this lubrication is of primary importance for a satisfactory operation ;

Assembling the component element of the freewheel may prove very difficult when the outer and inner rings are mounted separately in two separate sub-assemblies, before these sub-assemblies are actually assembled.

Freewheel designs are also known wherein the cam members are urged towards the inner ring by a common resilient member without resorting to any positioning separators or cages, the asymmetric shape of said cam members causing them to tilt under the centrifugal force. However, although this specific construction is advantageous in that it eliminates the drag torque when the cam members, under the pressure of the resilient member, are held in a wedge-free position, its sensitivity is questionable due to the contact between the cam members and between these cam members and their common resilient member, which leads to a wedging and frictional effect making it necessary to develop a greater starting centrifugal force for pivoting the cam members to their actual wedging position. As a result, when this pivotal movement begins all the cam members are locked simultaneously, thus causing an excessively abrupt engagement of the freewheel.

Now the freewheel mechanism according to this invention avoids these knwon inconveniences of hitherto known designs and harmonizes the hitherto contradictory requirements of a quick yet progressive engagement. To this end, the freewheel mechanism according to this invention comprises a series of cam members positioned by a cage and disposed between the inner and outer rings, and is characterized in that said cam members are held in proper spaced relationship along, and caused to bear on, said positioning cage by individual resilient means counteracting the influence of the centrifugal force, said cage being rigid with one of said rings, said resilient means being so designed that the contact between the cam members and the cages begins only at a predetermined rotational speed corresponding to the pivoting of a limited number of cam members of which the return force of the individual resilient means has the lowest value and is balanced by the centrifugal force.

It is an advantageous feature of the freewheel mechanism of this invention to provide a pre-assembled unit, including the cage and the wedging cam members, which is completely independent of the rings and can easily be fitted to or removed from said rings for example in case of replacement. Thus, this pre-assembled unit may constitute in many mechanisms an alternative to roller-bearing units.

The cam members of this invention are advantageously L-shaped and the wedging contour thereof is formed at the end of one arm of the cam member and on the opposite face thereof, in the vicinity of the external apex angle, the other arm acting as a rocking counterweight, the arm formed with the wedging contour being provided with a central orifice engageable by the bearing element of the resilient means.

One of the advantageous features characterizing the freewheel mechanism according to this invention is that the drag torque is zero when a ring rotates at a speed lower than a predetermined threshold (which is adjustable by construction). According to the construction type, the following two cases may be obtained :

a. The drag torque transmitted by the outer driving ring to the driven inner ring is zero when the inner ring revolves at a speed lower than a predetermined speed $V_1$. In this case, when the inner ring is the driving ring, it transmits the power torque to the driven outer ring when the speed attained by the inner ring exceeds the same predetermined speed $V_1$ ;

b. The drag torque transmitted by the inner driving ring to the driven outer ring is zero when the outer ring revolves at a speed lower than the predetermined speed $V_1$. In this case, when the outer ring is the driving member, the power torque is transmitted to the driven inner ring when the speed of the outer ring exceeds the same predetermined speed $V_1$.

It will readily appear to those conversant with the art that this absence of drag torque at low speed will not only reduce the time periods during which the device operates with a certain degree of friction, so that the lubrication problems are extremely simplified, but also have particularly valuable consequences in various types of operation.

Typical forms of embodiment of the freewheel according to this invention will now be described by way of example with reference to the accompanying drawing, in which :

FIG. 1 is a fragmentary view of a freewheel mechanism with a driving inner ring, in the specific case where the speed of this inner ring is lower than the limit speed $V_1$ beyond which the locking effect takes place ;

FIG. 2 shows the same freewheel when the speed of the inner ring exceeds said predetermined or limit speed $V_1$ ;

FIG. 3 is a section taken along the line III—III of FIG. 1 ;

FIG. 4 is a more detailed view of a locking cam member ;

FIG. 7 shows a section taken along the line VII—VII of FIG. 5;

FIG. 8 is a side elevational view of a wedging cam member, and

FIGS. 9 to 13 illustrates a typical application of the freewheel of this invention.

In all the figures of the drawing the same reference numerals designate the same component elements.

Figure 5:
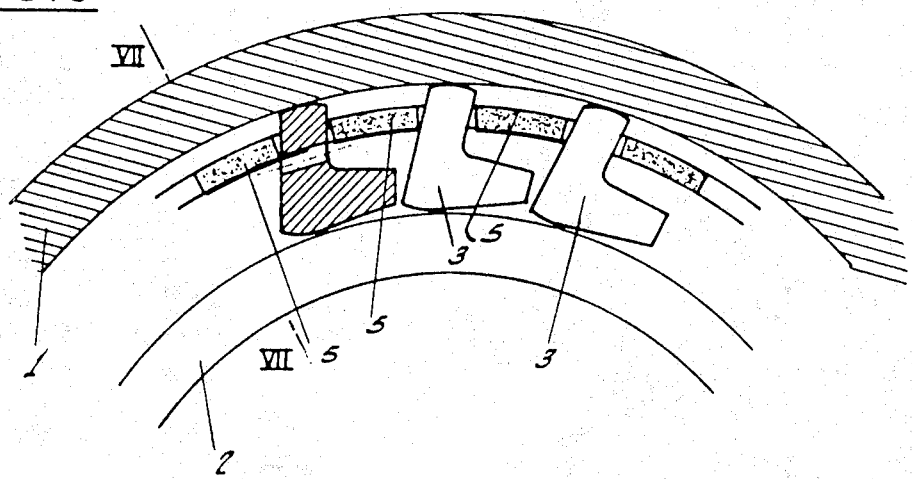
FIG. 5 is a fragmentary sectional view showing a freewheel device without any drag torque, with driving outer ring, in case this outer ring rotates at a speed lower than said limit value $V_1$.
Figure 6:
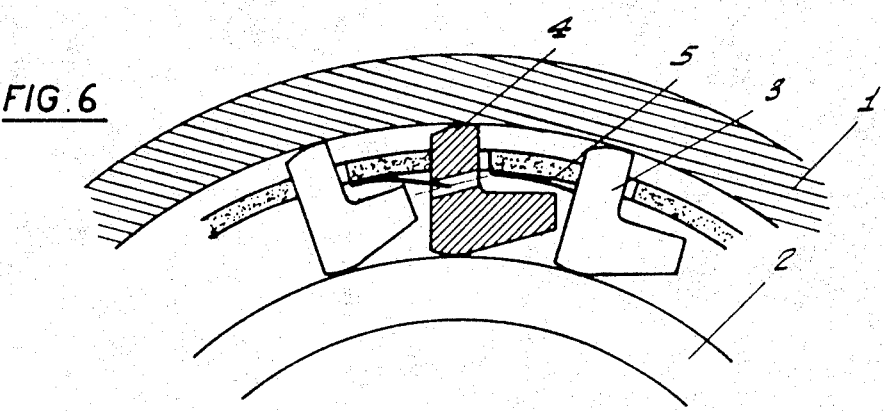
FIG. 6 shows the same freewheel in case the speed of the outer ring exceeds said limit value $V_1$.

In FIGS. 1 to 3 inclusive there is shown a freewheel device comprising an outer ring 1, an inner ring 2, wedging cam members 3 and a cage 4 adapted to retain the wedging cam members 3 in position. Spring blades 5 are secured by crimping to the cage 4 and engage with their free outer ends corresponding holes 10 formed in cam members 3.

The cage 4 is rigidly connected to the inner ring 2 and formed with spaced apertures engaged by the wedging members. A sufficient play J is provided to permit the cam oscillation. The cage and cam assembly is held against movement in the axial direction by a circlip or retaining ring 6, or any other equivalent means.

The cam members (FIG. 4) are each formed with a pair of opposite curved bearing surfaces 8, 9 adapted to engage the outer and inner rings, respectively, of the freewheel device. To facilitate the machining operations these curved bearing surfaces may have a cylindrical contour. The centres of these two cylindrical bearing surfaces are off-set so that, according to the position assumed by cam members 3 during the freewheel operation, a wedging effect can take place between the inner and outer ring of the freewheel. On one side of each cam member an inertia weight 7 is provided for creating an asymmetry in the mass thereof, so that during the operation of the device the centrifugal force thus developed will urge the cam mmeber for rotation in the direction shown in the figure. Centrally of the cam body a hole 10 is provided for receiving the free end of the relevant spring blade 5, as already explained hereinabove.

Thus, the cam members 3 are urged for engagement with the inner ring 2 by springs 5 secured to the cage 4 through any suitable means such as crimping, welding, fitting in a suitable cage recess, etc... Due to their symmetric action, these springs 5 exert a force counteracting the centrifugal force exerted on the inertia weights 7 and urging these inertia weight against the cage 4.

In this position, the envelope diameter measured on the outermost radius of the cam members is slightly smaller than the inner diameter of the outer ring, so that any contact between the inner ring and the outer ring is positively precluded; therefore, the drag torque is zero irrespective of the speed attained by the outer ring (FIG. 1).

When the speed of the inner ring increases, the inertia weights 7 of cam members 3 which are responsive to the centrifugal force thus developed cause the cam members 3 to rock in the counter-clockwise direction as seen in FIG. 1, the resilient return force of the cam springs 5 being balanced by the centrifugal force and the envelope diameter of the cam apices increases until (FIG. 2) the cam members engage the inner surface of the outer ring (at speed $V_1$). Under these conditions, beyond this speed $V_1$, freewheel operation is obtained. In other words, if the speed of the outer ring 1 is greater than the speed of the inner ring 2, the cam members 3 will slip on the outer ring 1 (transmission of a drag torque from the outer ring to the inner ring). When the inner and outer rings revolve at the same speed, no slip takes place and therefore any frictional contact is eliminated (zero torque transmission). When the inner ring 2 tends to revolve faster than the outer ring 1, the cam members contacting the rings and having the above-defined shape, a wedging effect is produced between the inner ring 2 and the outer ring 1.

In FIGS. 5 to 8 a similar type of freewheel is shown which operates according to the same principles as the preceding form of embodiment, except that the device is designed with a view to reverse the functions of the inner and outer rings 1, 2.

This modified form of embodiment operates as follows:

When the outer ring 1 is stopped or revolves at a speed lower than $V_1$, the inner ring rotating at any desired speed, no contact is produced between the inner ring 2 and the outer ring 1 carrying the cage and cam members in this case, so that the device operates with a zero drag torque. When the outer ring 1 revolves at a speed greater than $V_1$ and lower than the speed of the inner ring, the cam members engage the inner ring 2 and a drag torque is transmitted from the inner ring 2 to the outer ring 1. When the two rings 2, 1 revolve at the same speed $V_1$, then no torque is thus transmitted. When the outer ring 1 tends to revolve faster than the inner ring 2, the cam mmebers 3 are wedged between the two rings and the inner ring 2 revolves at the same speed as the outer ring 1.

Reverting to the case of the freewheel devices of figures 1 to 4, when the outer ring is stationary and the inner ring rotates up to said limit speed $V_1$, no specific effect is observed when the first cams of which the centrifugal force balances the resilient return force of springs 5 engage the outer ring 1 and produce a wedging action. Thus, the mechanism coupled to the outer ring is driven. The driving shock is attenutated by simply providing springs of different forces for the cam members. At said speed $V_1$ three equally spaced cam members engage the outer ring and are thus wedged. However, the torque to be transmitted being too high, there is a certain degree of slip between the cam members and the outer ring and the mechanism drivingly connected to this ring beings to rotate. As the speed of the inner ring increases, three other cam members engage in turn the outer ring and so forth until the number of cams becoming wedged is sufficient for transmitting all the torque without any slip. Thus, the shock produced when restoring the driving torque is attenuated.

The same lines of thought may be followed for understanding the mode of operation of the arrangement shown in FIGS. 5 to 8.

Figure 9:
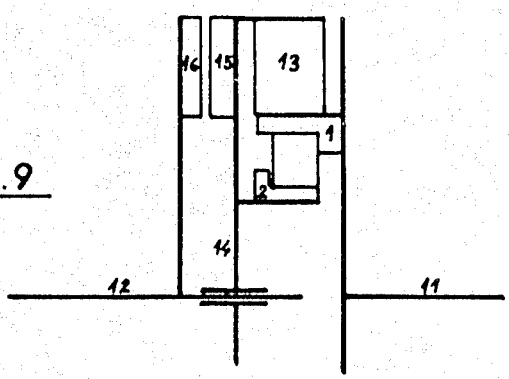

In order to afford a clearer understanding of the specific properties of the freewheel device of this invention, a typical application thereof will now be described with reference to FIG. 9 illustrating the coupling of a motor or engine with a change-speed transmission mechanism through a centrifugal clutch in an automotive vehicle.

A centrifugal clutch 13 and the outer ring 1 of a freewheel device according to this invention are connected to a driving or motor or engine shaft 11. The other section of centrifugal clutch 13 is connected to a plate 14 revolving freely on the input shaft 12 of the gearbox, together with the inner ring 2 of the freewheel and the first mechanically controlled clutch disk 15. The input shaft 12 of the gearbox is connected to the other clutch disk 16.

Assuming that the engine is idling, the centrifugal clutch is disengaged. The ring 1 revolves without transmitting any torque to the gearbox input shaft 12 since the inner ring 2 is at zero speed, so that no drag torque is available. With a conventional freewheel device, the drag torque would permit of driving the complete mechanism 2, 14, 15, 16 and 12, and thus the gear change applied to a moving member would take place under unfavourable conditions. This mode of operation is illustrated diagrammatically in FIG. 10, wherein 1 designates the power shaft during its rotation and 2 the stationary driven shaft. Since the drag torque is zero, the inner ring remains stationary irrespective of the speed of shaft 1.

A gear is engaged and by accelerating the engine the centrifugal clutch 13 causes the engine to be operatively connected to the change-speed transmission mechanism until no more slip is produced in the centrifugal clutch 13. The outer ring 1 and inner ring 2 will thus revolve at the same speed. The frictional contact between the cam members and the outer ring engaged thereby is zero.

This mode of operation is illustrated in FIG. 11.

When coasting is indulged in (over-run, when using the engine for braking purposes) the inner ring 2 tends to rotate faster than the outer ring 1. The cam members 3 are wedged and the driving gearbox remains coupled to the output shaft of the engine. The torque is transmitted through the freewheel even if the centrifugal clutch remains disengaged.

This mode of operation is illustrated in FIG. 12.

When the vehicle is still and its engine not running, and it is desired to start the engine through the gearbox, for example downhill, the gearbox to engine coupling or drive is obtained only above the limit speed $V_1$. At this speed $V_1$ the coupling would be rather fierce if the progressive calibration of the cam springs were not provided.

This mode of operation is illustrated in FIG. 13, wherein 1 designates the driven shaft, 2 the driving and revolving shaft. The torque is not transmitted through the freewheel as long as the speed of driving shaft 2 remains inferior to $V_1$.

Thus, the wear of the freewheel component elements is kept to a minimum, the frictional contacts occurring only during the transitory periods for passing from one speed range to another.

Therefore, due to this reduced wear the lubrication problem is considerably simplified.

In the inoperative condition the two sections of the freewheel are easily removable since a certain functional play is provided between the cam members and the corresponding carrier ring, so that the two sections of the freewheel can be mounted to different assemblies which are subsequently coupled without having to interfere with the freewheel elements.

Of course, various modifications and variations may be made without departing from the scope of the invention as set forth in the appended claims.

What is claimed as new is :

1. Freewheel device with gradual locking characteristic, which comprises a series of wedging cam members retained by a cage and disposed between an inner ring and an outer ring, characterized in that said cam members are held in proper relationship with each other and in bearing engagement with the cage in order that the cam members are adapted to rock in response to centrifugal force with individual resilient means connected to each cam to counteract the effect of the centrifugal force, said cage being connected to one of said rings, said cam members engaging said rings by pivoting under the control of the centrifugal force only beyond a predetermined speed given initially for a limited number of cam members of which the individual resilient means have the lowest return force balanced by the centrifugal force.

2. Freewheel device according to claim 1, characterized in that said wedging cam members are substantially L-shaped and the wedging contours thereof are located at the end of one arm of said member and on the opposite surface, in the vicinity of the external apex angle, the other arm forming a rocking counterweight, the arm formed with the wedging contours comprising intermediate its ends a through hole receiving the bearing point of said resilient means.

3. Freewheel device according to claim 1, characterized in that said individual resilient means associated with each cam comprise flat spring blades each having one end attached to said cage and the other end engaged in the bearing orifice of the relevant cam member.

4. Freewheel device according to claim 2, characterized in that said individual resilient means associated with each cam comprise flat spring blades each having one end attached to said cage and the other end engaged in the bearing orifice of the relevant cam member.

5. Freewheel device according to claim 3, characterized in that the springs secured to said cage are adapted to urge the cam members against the driving ring and to produce the engagement between said cam members and the driven ring beyond a predetermined speed.

6. Freewheel device according to claim 4, characterized in that the springs secured to said cage are adapted to urge the cam members against the driving ring and to produce the engagement between said cam members and the driven ring beyond a predetermined speed.

* * * * *